May 16, 1961  M. B. RIGGS  2,984,295
TOOL AND METHOD FOR MOUNTING TIRES HAVING SAFETY SHIELDS
Filed Feb. 3, 1958  3 Sheets-Sheet 1

INVENTOR.
MART B. RIGGS
BY
*R. L. Miller*
ATTORNEY

May 16, 1961 M. B. RIGGS 2,984,295
TOOL AND METHOD FOR MOUNTING TIRES HAVING SAFETY SHIELDS
Filed Feb. 3, 1958 3 Sheets-Sheet 2
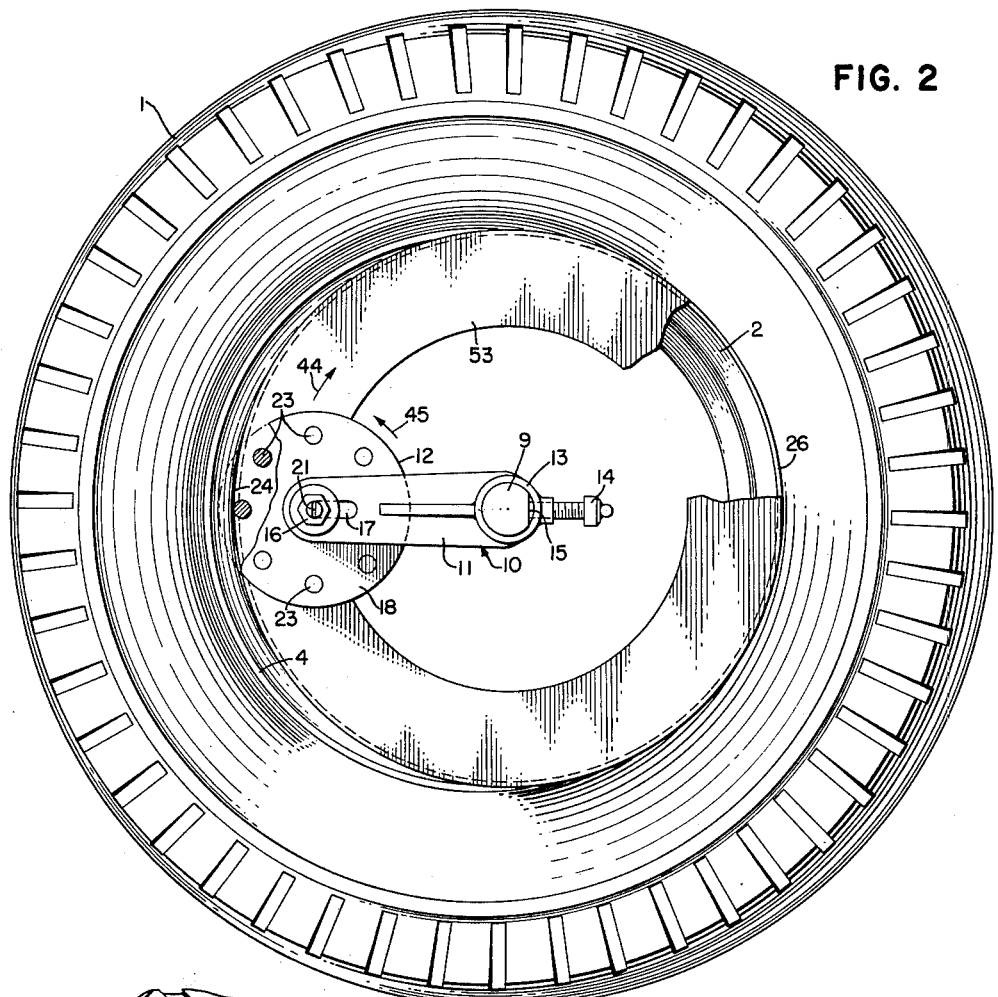
FIG. 2
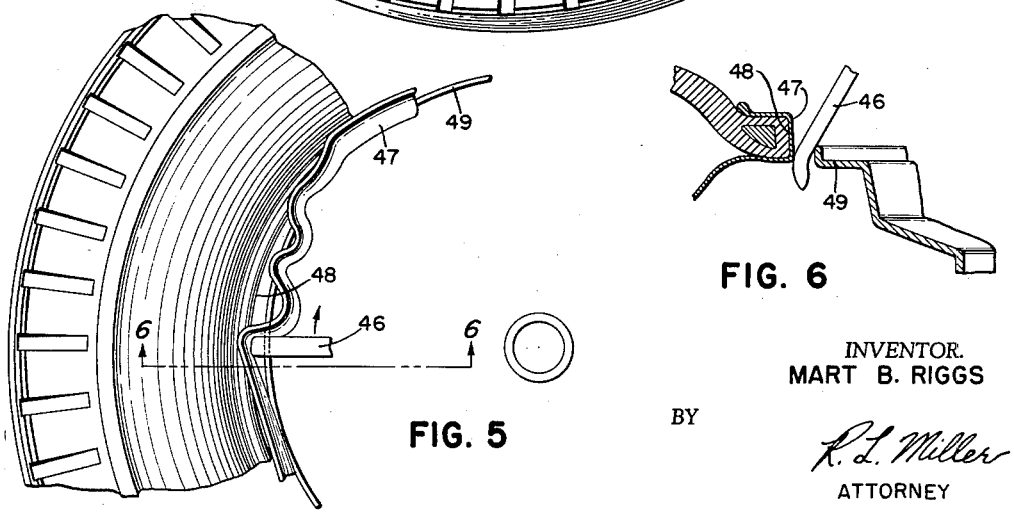
FIG. 5
FIG. 6
INVENTOR.
MART B. RIGGS
BY
R. L. Miller
ATTORNEY May 16, 1961  M. B. RIGGS  2,984,295
TOOL AND METHOD FOR MOUNTING TIRES HAVING SAFETY SHIELDS
Filed Feb. 3, 1958  3 Sheets—Sheet 3

INVENTOR.
MART B. RIGGS
BY
*R. L. Miller*
ATTORNEY

United States Patent Office 2,984,295
Patented May 16, 1961

2,984,295

TOOL AND METHOD FOR MOUNTING TIRES HAVING SAFETY SHIELDS

Mart B. Riggs, Akron, Ohio, assignor to The Goodyear Tire & Rubber Company, Akron, Ohio, a corporation of Ohio Filed Feb. 3, 1958, Ser. No. 712,830

7 Claims. (Cl. 157—1.24)

This invention relates to an apparatus and method for mounting tires on wheel rims and particularly to mounting tubeless tires having safety shields therein.

The modern tubeless tire is often equipped, for reasons of passenger safety, with an inner diaphragm, referred to generally as a safety shield, which divides the tire interior into two radially spaced annular chambers. The action of such diaphragms or shields is to prevent loss of air from the inner chamber if the outer chamber becomes ripped or punctured. One such shield is formed with channeled edges or peripheral flaps which are designed to extend between the tire beads and bead-seating surfaces of a rim, as in U.S. Patent 2,756,800, and which function, when the tire is inflated, to lock the shield in place and also to seal the space between the tire bead and rim. The mounting of a tire equipped with such a shield has presented problems when conventional tire mounting devices are used, in that the portion of the shield under the bead, being unattached to the tire and being relatively thin, tends to pile up ahead of the mounting tool and to double over during the mounting to form a pleat, whereby the shield is improperly seated and in many cases is damaged as the tool slides over the pleat.

Thus, a primary object of this invention is to provide an apparatus and method for mounting shield equipped tires which avoids pile-up of the material and consequent damage to the shield.

It is a further object of the invention to provide an apparatus and method for mounting such tires which utilizes a tool that rotates in contact with the shield to prevent pile-up of the material in advance of the tool.

These and other objects of the invention will become apparent from the following description and drawings in which:

Fig. 2 is a top plan view of Fig. 1;

Fig. 5 is a fragmentary plan view showing the action of a conventional tool used in place of the tool in Figs. 1 to 4 inclusive;

Fig. 6 is a section taken along the line 6—6 of Fig. 5.

Figure 1:
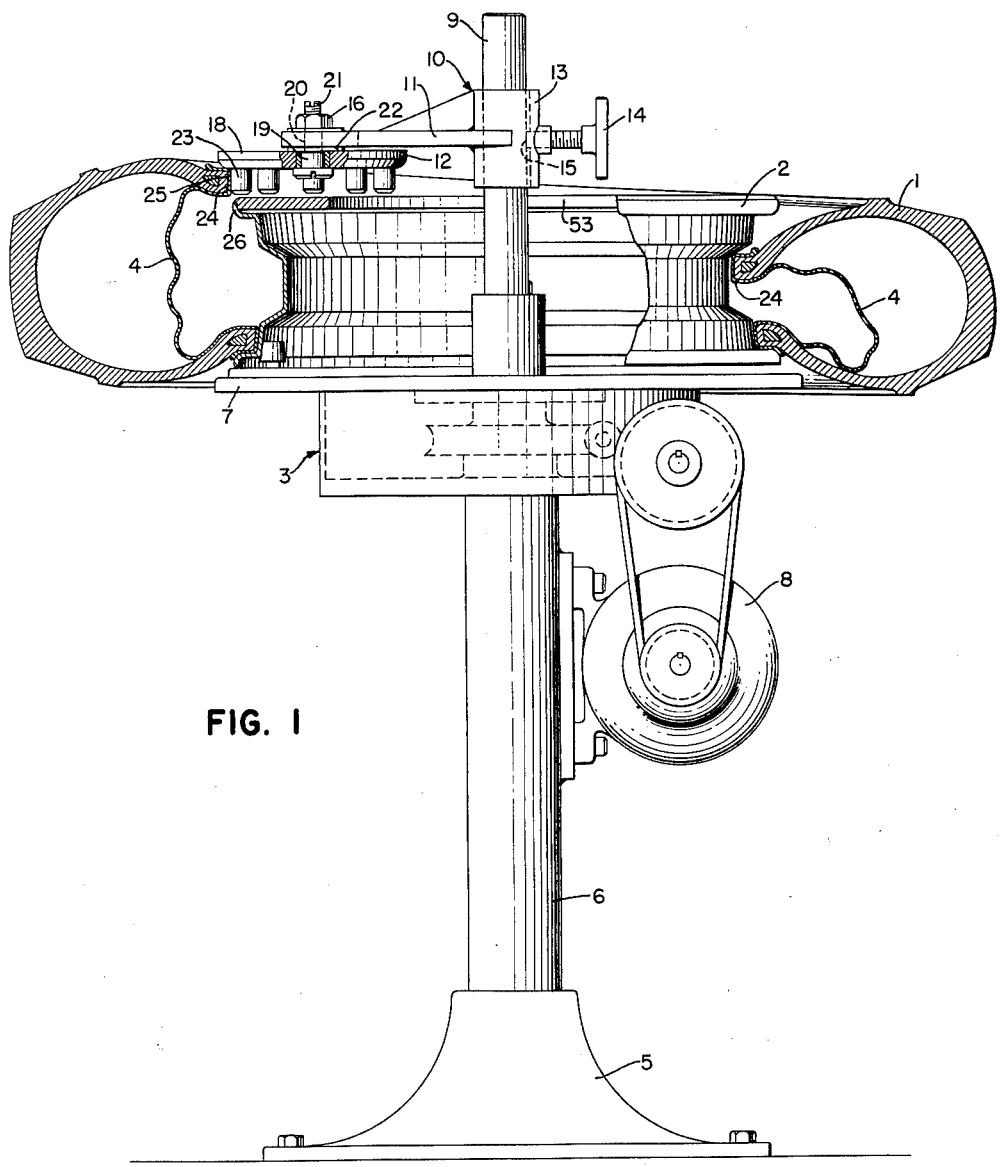
Fig. 1 is a partially sectionalized front elevation of a tire mounting machine equipped with a tool according to the present invention.

Referring to Fig. 1, a tire 1 is partially mounted on a rim 2 which is attached to a tire mounting machine designated generally by the numeral 3. A safety shield 4 having channeled edges which give it an omega-shaped cross-section is mounted in the tire. The tire mounting machine 3 is of the power-driven type and comprises a base 5, a center column 6 attached thereto which has a stationary rim supporting table 7 mounted at the upper extreme thereof. A power drive unit 8 is attached to the center column 6 and is mechanically connected through a gear train (not shown) to the rotatable spindle 9 which is suitably journaled at its lower end and extends upwardly from the table 7 through the center of the rim. The rim 2 is secured to the plate 7 by means of adjustable clamps (not shown) and, hence, the center spindle 9 also rotates with respect to the rim and tire. It would, of course, be possible to have the spindle 9 remain stationary while the table 7 and rim 2 rotate. The present invention is operative in either case since all that is required, as will later be evident, is a relative rotation between the tool and the rim and tire.

A tool, designated generally by the numeral 10, made according to the present invention is shown mounted on the center spindle 9. The tool comprises a supporting arm 11 whose effective lever arm is substantially parallel to the rim support table 7. A tacking means in the form of a starwheel 12 is rotatably mounted at one end thereof and positioned with its axis of rotation substantially perpendicular to the effective lever arm of the support arm 11 and the table 7. At the other end of the arm is a sleeve 13 which fits over the center spindle 9 and is secured thereto by a clamp screw 14 which engages a flat spot 15 on the shaft to cause the tool to rotate with the spindle. If desired the sleeve 13 may be splined to the spindle 9. By loosening the screw 14, the tool may be raised or lowered on the spindle so that the starwheel may be moved in relation to the tire mounting machine in order to accommodate tires and rims of various widths. The starwheel 12 may be adjusted along the longitudinal axis of the support arm 11 by loosening the nut 16 shown in Fig. 2 and sliding the starwheel assembly along the slot 17 in the support arm 11 to the desired location and then tightening the nut once more. This permits adjustment to accommodate tires and rims of various diameters.

The details of a typical starwheel and its mounting may be seen in Figs. 1 and 2. The starwheel 12 has a top plate 18 which is centrally drilled to receive bearing 19. Bearing 19 is attached to threaded shaft 20, which extends from the starwheel to the support arm 11, by means of a conventional threaded screw 21 set into shaft 20. The starwheel 12 is spaced from the support arm 11 by a spacer bearing 22 mounted on shaft 20 and inserted between the starwheel and the arm 11. Arm 11, as previously mentioned, has a slot 17 cut longitudinally thereof through which shaft 20 extends and to which the shaft is secured by means of lock nut 16. A plurality of peg-type teeth 23 are secured to the underface of plate 18 at substantially equal spacing about the periphery thereof. As will become clear from the subsequent discussion, the teeth 23 engage the channeled edge 24 of the diaphragm 4 and temporarily tack it against the bead 25 of the tire 1 while the bead and flap are forced outwardly of the flange 26 of the rim 2. It is obvious that starwheels of vairous designs may be used, for example the type shown in Fig. 4 which resembles a spur gear. The term starwheel is used herein to include all types of tacking wheels wherein the portion of the wheel performing the tacking operation presents a series of raised and indented portions, whether the specific form is a gear, peg-tooth or crimped ring type, etc. Furthermore, the number and spacing of the raised portions may vary widely in order to secure maximum tacking and rotational efficiencies of the starwheel under different operating conditions.

Figure 3:
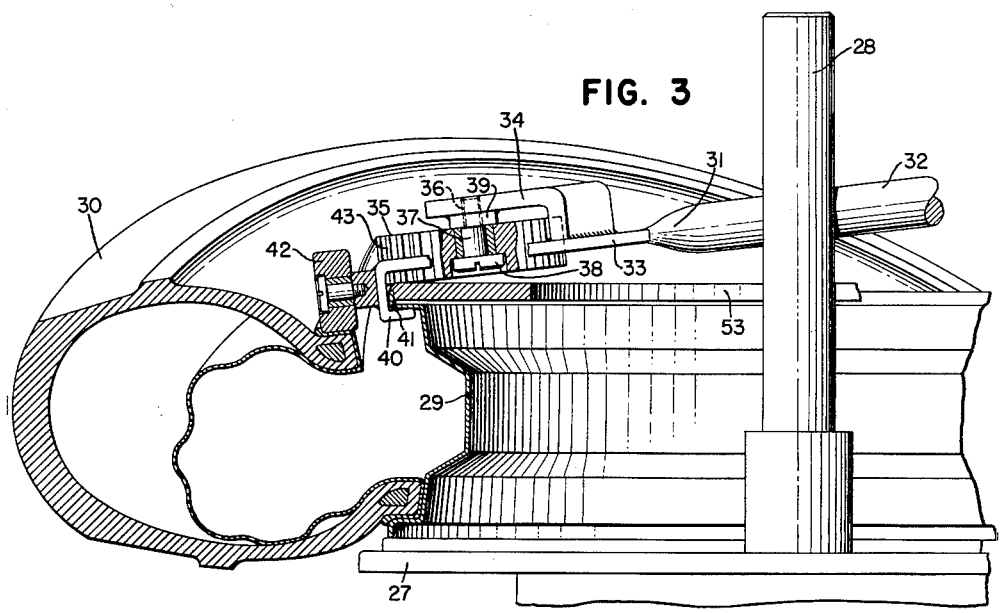
Fig. 3 is a partial elevation of a tire mounting machine showing another type of tool according to the present invention.
Figure 4:
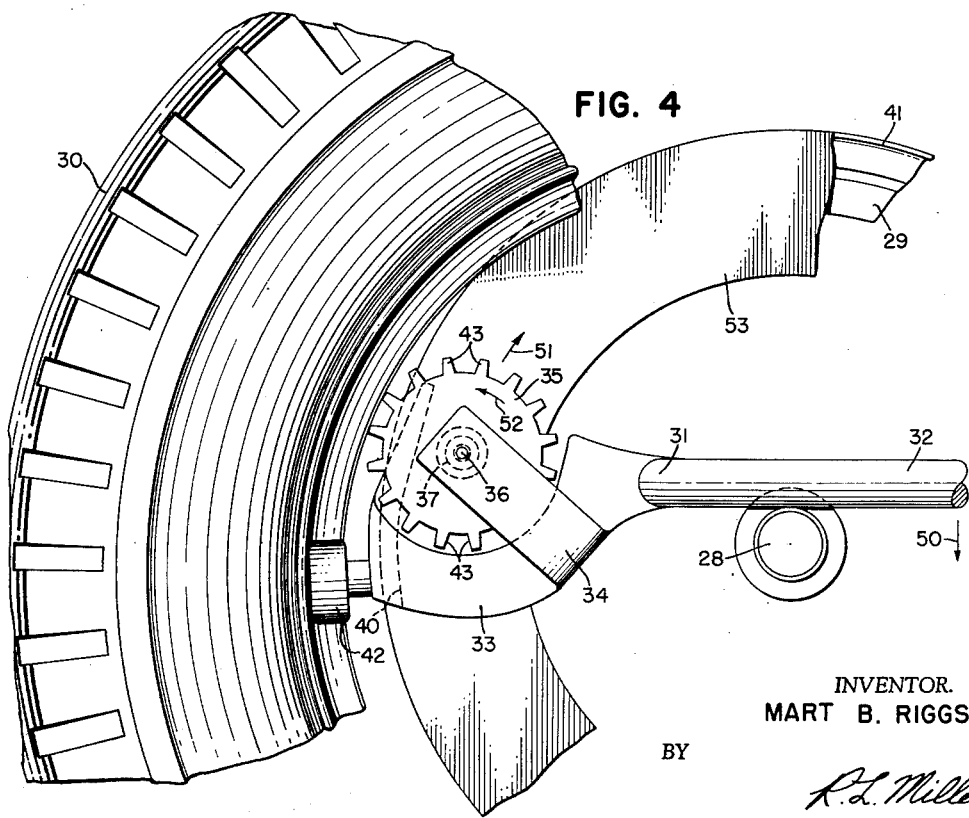
Fig. 4 is a partial top plan view of the machine and tool of Fig. 3.

A modification of the tool for mounting shield equipped tires is shown in Figs. 3 and 4. The starwheel there shown has been mounted in a slightly different manner for use with a manual tire mounting stand which has a base and center column (not shown) similar to that in Figs. 1 and 2. A rim support table 27 is attached to the center column and has a center spindle 28 secured thereto in non-rotatable relationship with the table 27. A rim 29 is attached to the table 27 by adjustable clamps (not shown) and has a shield equipped tire 30 partially mounted thereon. The tool comprises an arm 31 having a handle portion 32 at one end thereof and an angularly disposed offset portion 33 at the other end. An angle bracket 34 is attached to the offset portion 33 and extends at an angle thereto, terminating generally at a point along the axial centerline of the arm 31. A starwheel 35 is rotatably attached to the bracket 34 by means of pin 36 which is secured to bracket 34 and bearing 37 and threaded lock screw 38 in the centrally drilled recess in the starwheel 35. A spacer bearing 39 between the bracket 34 and starwheel 35 prevents excessive friction therebetween and, hence, facilitates rotation of starwheel 35 about pin 36. The starwheel 35 has a series of gear type teeth 43 spaced at substantially equal intervals about its periphery. The offset portion 33 of the arm 31 has a downwardly and radially inwardly extending hook portion 40 at the end thereof and adapted to engage the rim flange 41. In addition, a guide wheel 42 is rotatably mounted to the vertical face of hook portion 40 and adapted to ride along the bead area of the tire as the tool is rotated. Except for certain modifications required because manual power is utilized, the action of the tool is substantially the same as that shown in Figs. 1 and 2 which will now be described.

In Fig. 1, the peg-teeth 23 of the starwheel 12 contact the diaphragm edge 24, temporarily tacking it against the tire bead 25 and preventing circumferential movement of the diaphragm with respect to the tire. The longitudinal position of the starwheel is set by means of the mechanism previously described so that the radially outer reach of the teeth 23 clears the rim flange 26 and, due to its engagement with the diaphragm or shield and tire bead, urges them outwardly beyond the flange 26. The starwheel 12 is designed with the top plate 18 extending slightly outwardly of the teeth of the starwheel and over the bead shoulder to keep the shield in place and prevent upward movement of the tire bead away from the flange. As is conventional, the portion of the bead opposite the segment being mounted has been previously buttoned down into the drop center of the rim to provide the needed slack in the bead so that it can be forced over the rim by the starwheel. Once the tool is adjusted so that, as shown in Fig. 1, the starwheel is in engagement with the shield and tire bead, the operator turns on the power drive and the tool is rotated by the spindle, walking the starwheel around the rim periphery and forcing the tire bead and shield out beyond the rim flange. Since the opposite portion of the tire bead is lower, being already buttonholed into the drop center portion of the rim flange, the tire bead and shield will be pulled downward over the flange due to the natural downward force exerted by the portion of the tire already buttonholed onto the rim.

The action of the starwheel may be more clearly understood by examination of Fig. 2 illustrating the present invention and a comparison with Figs. 5 and 6 which illustrate the action of a conventional tool. In Fig. 2, it will be seen that the shield and bead tend to bridge between the teeth of the starwheel as it walks around the rim temporarily tacking the diaphragm to the bead. Thus the shield is held firmly against the tire bead at at least two points, at least one of which is in advance of the portion of the bead and shield actually passing over the rim flange. Hence, the starwheel as it advances and walks on its teeth around the bead periphery, presses the shield against the bead and temporarily tacks it in position to prevent its slipping in a circumferential movement of the diaphragm. The teeth of the starwheel are preferably spaced so that at least two teeth will be in contact with the tire bead at all times so the portion of the shield held therebetween remains taut, preventing the formation of folds in the shield material at the point it passes over the rim flange. With some tools more than two teeth may contact the shield to tack it at a plurality of points in advance. The starwheel teeth do not, of course, disengage from the shield until it is safely over the rim flange. As shown in Fig. 2, the motion of the tool is in the direction of the arrow 44 while the rotation of the starwheel is that of the arrow 45.

The distinct advantages of the present invention will be readily appreciated by consideration of the operation of a conventional tool as shown in Figs. 5 and 6. The typical tool in commercial use consists, in place of the starwheel of the present invention, of an angularly disposed finger 46 which rides against the shield 47, pressing it against the bead 48. The finger 46 extends downwardly and over the rim flange 49 to provide a guide for the tire as it moves outwardly and down onto the rim as seen in Fig. 6. With this tool the sliding friction between the tool and shield is sufficient to cause a "pile up" or bunching of the loose shield in advance of the tool as illustrated in Fig. 5. This results in improper placement of the shield and in many cases, as the pile up becomes large, results in the formation of a pleat in the diaphragm edge and a ripping or tearing of the material as the tool rides over the pleat. Furthermore, the tool may abrade away the sealing rubber on the fabric of the shield as the tool slides over it. Flanged wheels have also been tried as a solution to the problem, the wheel being disposed horizontally and rolling over the shield as it is rotated. However, these too have been found to cause pile up of the shield due to the tendency of the shield to run ahead of the wheel contact point. The tacking of the shield to the bead in advance of the point of flange clearance as is accomplished by the tool of the present invention provides a method of avoiding these difficulties and an efficient reliable means for mounting shield containing tires.

A brief consideration of the tool illustrated in Figs. 3 and 4 will aid in an understanding of the modifications therein. The action of the tacking means 35 is substantially the same as previously described, the one illustrated being a gear type starwheel as contrasted to the peg-tooth type shown in Fig. 1. Since the tool here is for manual use, the offset 33 is provided with a hook-like portion 40 extending downwardly and inwardly to ride along the underside of the rim flange 41 below the starwheel to prevent the starwheel from being tipped up off the tire and disengaged from the tire bead and shield. Furthermore, a rotatable guide wheel 42 is provided which is positioned below and in back of the contact point between the starwheel and shield and rides along the tire sidewall. The guide wheel thus assists in forcing the shield and bead down into position within the rim once they have been urged beyond the flange by the starwheel. However, primarily the guide wheel 42 provides a convenient support for resting the tool in operative position during the mounting operation. When force is applied to the handle 32 in the direction of the arrow 50, the end of the tool rotates about fixed spindle 28 moving the end carrying the starwheel in the direction indicated by arrow 51. This causes rotation of the starwheel 35 in the direction of the arrow 52 because of which it tacks the shield against the bead as it moves around the tire. The rims in Figs. 2 and 4 are both equipped with an annular disk 53 which fits the inside flange circumference and provides a smooth surface over which the tire and diaphragm are moved during mounting to prevent damage thereto as they slide over the rim flange.

While certain representative embodiments and details have been shown for the purpose of illustrating the invention, it will be apparent to those skilled in this art that various changes and modifications may be made therein without departing from the spirit or scope of the invention.

I claim:

1. A tool for mounting a tire on a rim while said rim is on a tire mounting machine, said tire having beads and equipped with a diaphragm having channeled edges receiving said beads and said machine including rim support means and a spindle arranged thereon substantially in alignment with the axis of a rim mounted on said support means, comprising in combination an arm adapted to be disposed with its effective lever arm substantially parallel to the plane of said rim support means and extending radially outwardly from said spindle, freely rotatable tacking means mounted on said arm adjacent the radially outer portion thereof and having its axis of rotation substantially perpendicular to the plane of said rim support, said tacking means having peripheral portions projecting radially outwardly at least to the edge of said rim and means attached to the radially inner portion of said arm adapted to cooperate with said spindle to permit rotation of said tool about said axis of said rim.

2. A tool as claimed in claim 1 in which said tacking means is adjustably positionable with respect to said machine whereby tires of various sizes can be accommodated.

3. A tool for mounting a tire on a rim while said rim is on a tire mounting machine, said tire having beads and equipped with a diaphragm having channeled edges receiving said beads and said machine including rim support means and a spindle arranged thereon substantially in alignment with the axis of a rim mounted on said support means, comprising in combination an arm adapted to be disposed with its effective lever arm substantially parallel to the plane of said rim support means extending radially outwardly from said spindle, freely rotatable starwheel means mounted on said arm adjacent the radially outer portion thereof and having its axis of rotation substantially perpendicular to the plane of said rim support, said starwheel means having peripheral portions projecting radially outwardly at least to the edge of said rim, and means attached to the radially inner portion of said arm adapted to cooperate with said spindle to permit rotation of said tool about the axis of said rim.

4. A tool for mounting a tire on a rim while said rim is on a tire mounting machine, said tire having beads and equipped with a diaphragm having channeled edges receiving said beads and said machine including rim support means and a spindle arranged thereon substantially in alignment with the axis of a rim mounted on said support means, comprising in combination an arm adapted to be disposed with its effective lever arm substantially parallel to the plane of said rim support means and extending radially outwardly from said spindle, freely rotatable tacking means mounted on said arm adjacent the radially outer portion thereof and having its axis of rotation substantially perpendicular to the plane of said rim support, said tacking means having peripheral portions projecting radially outwardly at least to the edge of said rim, guide means attached to said arm adjacent said tacking means and in underlying relation thereto and adapted to engage the inner flange face of a rim to provide a fulcrum for said arm, and handle means attached to the radially inner portion of said arm and adapted to cooperate with said spindle to permit rotation of said tool with respect to said axis of said rim.

5. A tool as claimed in claim 4 including bearing means attached to said arm adjacent said tacking means and disposed to ride along the sidewall of a tire being mounted on a rim by said tool.

6. The method of mounting a tire on a rim, said tire having beads and equipped with a diaphragm having channeled edges receiving said beads, comprising the steps of initially buttoning a portion of the tire bead and diaphragm edge over the rim flange and progressively forcing the unmounted portion of the bead and diaphragm over the flange while simultaneously temporarily tacking the diaphragm edge to said bead at spaced points progressively in advance of the portion of the bead and diaphragm being forced over the rim flange.

7. The method of mounting a tire on a rim, said tire having beads and equipped with a diaphragm having channeled edges receiving said beads, comprising the steps of initially buttoning a portion of the tire bead and diaphragm edge over the rim flange and forcing the unmounted portion of the bead and diaphragm over the flange while simultaneously temporarily restraining said diaphragm progressively from circumferential movement with respect to said tire by urging said diaphragm against the bead at spaced points along the periphery thereof.

References Cited in the file of this patent
UNITED STATES PATENTS

| | | |
|---|---|---|
| 1,428,440 | Kerschbaum | Sept. 5, 1922 |
| 2,437,512 | Ekse | Mar. 9, 1948 |
| 2,505,172 | Coats | Apr. 25, 1950 |
| 2,546,988 | Eberly | Apr. 3, 1951 |
| 2,556,024 | Bourdon et al. | June 5, 1951 |
| 2,569,788 | Weaver | Oct. 2, 1951 |